United States Patent Office 2,698,723
Patented Jan. 4, 1955

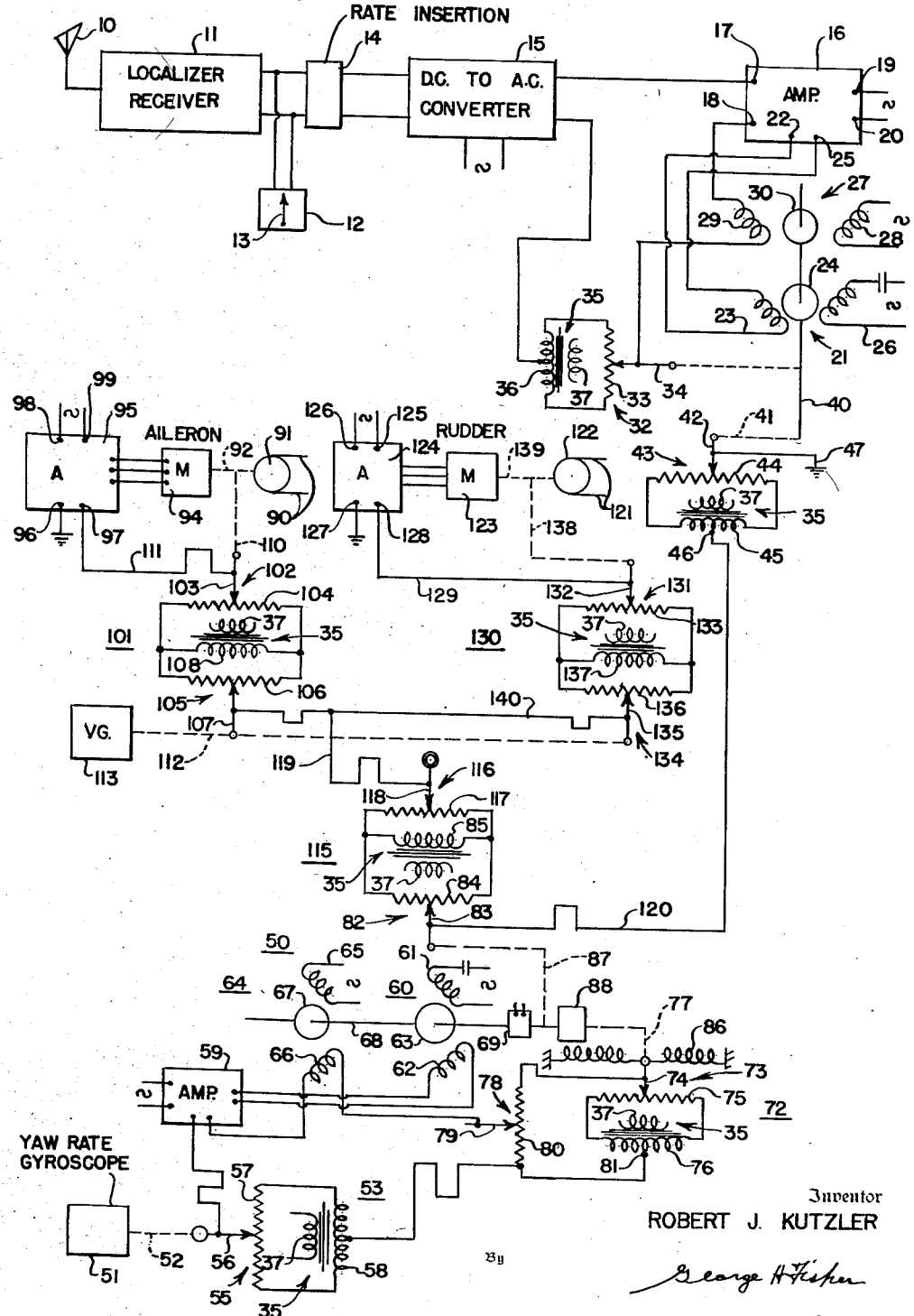

2,698,723
AUTOMATIC PILOT

Robert J. Kutzler, Richfield, Minn., assignor to Minneapolis-Honeywell Regulator Company, Minneapolis, Minn., a corporation of Delaware Application January 6, 1951, Serial No. 204,731

6 Claims. (Cl. 244—77)

This invention pertains to automatic steering apparatus used on aircraft or other dirigible craft for the purpose of directing the craft along a ground track defined by overlapping radio signals. The invention more particularly relates to means for correcting the heading of a craft to compensate for drift.

It has heretofore been proposed to utilize positional signals transmitted by a radio station for operating a cross pointer meter located on an aircraft thus giving the pilot a radio indication of the distance of his craft from a plane of equal modulation defined by means of doubly modulated radio signals. A pilot can manually maintain the craft upon the plane of equal modulation or ground track in response to the indications on the cross pointer meter. These indications may be employed to control an automatic pilot having a directional gyroscope for heading control. This automatic pilot, however, in the event of a cross wind will be unable to hold the craft upon the desired ground track but instead will maintain a heading which is displaced from the ground track.

One of the objects of the present invention is to provide a novel apparatus for automatically steering an aircraft along a ground track.

Another object is to provide a novel apparatus for automatically steering an aircraft along a ground track, the aircraft being subject to cross winds.

A further object of the invention is to provide novel apparatus which functions to correct a heading of an aircraft to compensate for a cross wind acting upon the craft.

A further object of this invention is to control the flight path of an aircraft in accordance with the departure of the craft from a radio beam defined ground track and from a novel heading change responsive device.

A further object of this invention is to automatically control the flight path of an aircraft in accordance with the departure of the craft from a ground track and the integrated rate of change of heading of the craft.

A still further object of this invention is to combine an approach coupler which provides a signal proportional to the lateral distance of an aircraft from a ground track with apparatus including a rate gyroscope responsive to the turning of the aircraft in heading which apparatus derives in the nature of a partial integration of the change of heading and a signal proportional thereto, said signals controlling the flight path of the craft, with respect to the ground track.

These and other objects and novel features of the invention will more fully appear from the following detailed description thereof when the same is read in connection with the accompanying drawing.

In the drawing:

The sole figure is a schematic diagram of one embodiment of the invention for controlling the flight of an aircraft.

In carrying out the above objects, I provide a motor for initially controlling the heading of the aircraft. The motor is controlled by a positional signal obtained from a radio localizer receiver which signal varies in amplitude and phase according to the amount of departure of the aircraft from a ground track. The signal from the localizer receiver is passed through a rate insertion network and thence to a converter where a direct current control signal proportional to the departure of the aircraft and to the rate of change of departure is converted to alternating current and then supplied to an amplifier which controls the motor. The motor may be of the two-phase or capacitor inductor type. The motor operates a rebalancing potentiometer until the signal therefrom is equal to the converted localizer receiver signal. This motor also operates a signal generator in an automatic pilot system which supplies signals that are applied to an autopilot aileron servomotor amplifier and an autopilot rudder servomotor amplifier. The amplifiers control aileron and rudder servomotors to introduce changes in heading of the aircraft.

A rate gyroscope in response to such change in heading or yaw applies a control signal to an amplifier control circuit which controls a second two-phase motor. The second motor drives a velocity signal generator connected to this amplifier control circuit in such manner that the signal from the velocity signal generator initially is approximately equal, except for the small error signal required to energize the motor, to the signal from the rate gyroscope. The motor also operates through a gear train a second motor displacement signal generator which also supplies a signal to the amplifier control circuit until such time as the signal from this displacement signal generator equals the signal from the rate gyro signal generator at which time the rotation of the two-phase motor ceases.

The motor also operates a motor displacement signal generator in the automatic pilot system which signal generator provides a signal which resembles a partial integration of the rate of change of heading of the aircraft as sensed by the rate gyroscope. The partial integration signal like the modified localizer signal is also applied to the aileron and rudder servomotor amplifiers to control the direction of heading of the aircraft.

A vertical gyro is also provided in the automatic pilot system for generating signals in the aileron and rudder amplifier circuits in order to cause the bank of the aircraft to be in proportion to the resultant of the unbalance directional control signals in the automatic pilot system from the localizer receiver motor and the rate gyro controlled motor. The aileron and rudder servomotor also operate signal generators to provide a proportional control system for the respective servomotors.

The invention will be further understood from the following detailed description. Referring to drawing, there is shown an antenna 10 for receiving radio signals. The signals from the antenna are transmitted to a localizer radio receiver 11. The localizer receiver output consists of two alternating current signals of different frequencies which signals are separately rectified. These rectified signals are opposed against each other to produce a resultant D. C. signal proportional to the difference between the original A. C. signals. A localizer receiver of the above type is well-known in the art. The resultant D. C. signal from the output of the localizer receiver is applied to a cross pointer meter 12. The cross pointer meter 12 includes a pointer 13 which is deflected in one direction or in another depending upon the displacement of the craft from the plane of equal modulation or ground track. The resultant signal from the localizer receiver is also applied to a rate insertion network 14 which is of the conventional resistor capacitor type. The output of this rate insertion network is a modified D. C. signal having components proportional to the displacement of the craft from the ground track and proportional to the rate of change of displacement of the craft from the ground track. The output of the rate network 14 is applied to a D. C. to A. C. converter 15 which is energized from a 400 cycle source of voltage. This converter may be of a known vibrator type.

The output of the converter 15 which is a combined displacement and rate of displacement voltage signal is used to control a directional control motor amplifier 16 often termed a coupler amplifier.

The amplifier 16 is the phase sensitive type having control signal input terminals 17, 18; power input terminals 19, 20 connected to a 400 cycle source; and output terminals 22, 25. The output voltage across terminals 22 and 25 depends in phase upon the phase relationship of the signal voltage across input terminals 17 and 18 with respect to the voltage across power input terminals 19 and 20.

Amplifier 16 controls a directional control coupler motor 21 which is a capacitor type induction motor having a line winding 26 connected to a 400 cycle source and a phase winding or amplifier winding 23. The motor includes a conventional induction rotor 24. The winding 23 is connected to the output terminals 22, 25 of amplifier 16 and rotates in one or another direction depending upon the phase relationship stated of the voltages previously described. The motor 21 is connected in driving relationship to a motor rotation velocity generator 27. This velocity generator, or alternatively termed a dynamic transformer, includes a primary winding 28 connected to a 400 cycle source, a secondary winding 29 normally in non-inductive relationship with primary winding 28, and a rotor 30 for inductively associating the secondary winding with the primary winding. The voltage generated in secondary winding 29 is in accordance with the speed of rotation of the motor 21.

Operatively driven by the motor 21 is a coupler motor position or rebalancing potentiometer 32. The potentiometer 32 includes a resistor 33 and a slider 34. Potentiometer 32 is energized from a transformer 35 which has a primary winding 37 connected to the 400 cycle source and a secondary winding 36. The secondary winding 36 is connected across the resistor 33 of potentiometer 32.

The D. C. to A. C. converter 15, the velocity generator secondary winding 29, and the potentiometer 32 are connected in electrical series relation so that the amplifier 16 is controlled by the resultant or algebraic sum of the three voltage signals supplied by these elements. In this arrangement, the signal from the velocity generator secondary winding 29 which is proportional to the speed of rotation of motor 21 serves to damp the rotation of the motor so that the signal from potentiometer 32 is proportional to the signal from the converter 15.

The coupler motor 21 has its output shaft 40 connected through an operating means 41 to a slider 42 of an aircraft directional control potentiometer 43. Potentiometer 43 includes a resistor 44 which is connected across a secondary winding 45 of a transformer 35 having a primary winding 37. Since a transformer may have a single primary winding for supplying a plurality of secondary windings, the transformer and the primary winding may be identically indicated in the several potentiometer circuits. The slider 42 has a conductor 47 extending therefrom which is connected to ground. The secondary winding is provided with a center tap 46. It is thus evident that potentiometer 43 will provide a signal between the slider and the center tap 46 proportional to the lateral displacement of the craft from the ground track.

The apparatus includes an arrangement 50 for integrating the rate of change of heading of the craft. The arrangement includes a rate gyroscope 51 responsive to the rate of change of heading of the craft; a rate gyroscope operated signal generator 53; a phase sensitive amplifier 59; a capacitor type induction motor 60; a motor velocity signal generator 64; a motor controlled signal generating network 72; and a rate of change of heading integration signal generating network 82.

The rate gyroscope 51 is of the type well known in the art having a rotor with two degrees of angular freedom and with a spin axis which is horizontal. The rotor is conventionally mounted for rotation in a casing which in turn is trunnioned on a horizontal axis at right angles to the spin axis and restraining means are applied to this axis of the trunnions. The arrangement is so mounted in the craft that upon rate of change of heading of the craft, the gyro rotor will precess about the axis of the trunnion and the extent of precession is proportional to the rate of change of heading of the craft. Such gyroscopes are illustrated for example in Figure 1 of the patent to Thiry 2,190,390.

The network or signal generator 53 consists of a rate gyro operator potentiometer 55 having a slider 56 and a resistor 57. The resistor 57 is connected across a secondary winding 58 of transformer 35 having a primary winding 37. The slider 56 is moved by the rate gyro 51 through an operating connection 52 in accordance with the rate of change of heading of the craft.

The phase sensitive amplifier 59 may be similar to the amplifier 16 previously described and has one pair of signal input terminals, a pair of power input terminals connected to the 400 cycle source and a pair of output terminals. The motor 60 is a capacitor type induction motor having a line winding 61 connected to the 400 cycle source, an amplifier energized phase winding 62, and a rotor 63. The motor 60 is reversibly controlled from the amplifier 59.

The velocity generator or dynamic transformer 64 includes a primary winding 65 connected to the 400 cycle source, a secondary winding 66 and a rotor 67. The arrangement is such that the voltage in the secondary winding 66 is proportional to the speed of rotation of motor 60.

The motor control network 72 comprises a potentiometer 73 having a slider 74 and a resistor 75. The resistor 75 is connected across the ends of the secondary winding 76 of transformer 35 having a primary winding 37. The network 72 includes a voltage dividing potentiometer 78 having an adjustable tap 79 and a resistor 80. The resistor 80 is connected across the slider 74 and a center tap 81 of secondary winding 76. The tap 79 is manually adjustable. The slider 74 is positioned through an operating connection 77 and through a magnetic clutch 69 from the output shaft 68 of the motor 60. The slider 74 is provided with a spring means 86 which serve to center the slider 74 upon opening of the magnetic clutch 69.

The integration potentiometer 82 comprises a slider 83 and a resistor 84. Resistor 84 is connected across the secondary winding 85 of transformer 35 having the primary winding 37. The slider 83 is positioned from the motor shaft 68 through the magnetic clutch 69 and an operating connection 87.

The integration potentiometer 82 and the coupler motor autopilot potentiometer 43 are connected in a control circuit to be described. Digressing from a discussion of the control circuit, we may consider the operating means for the control surfaces of the aircraft. The aileron surface (not shown) is operated by cables 90 extending from a cable drum 91 carried by a shaft 92 driven from an aileron servomotor 94. The aileron servomotor 94 is reversibly controlled by an aileron amplifier 95. The aileron amplifier 95 is provided with signal input terminals 96, 97, and power input terminals 98, 99 connected to the 400 cycle source. The amplifier 95 is of the discriminator type, and the direction of rotation of servomotor 94 depends upon the phase relationship of the voltage applied to control signal terminals 96 and 97 with respect to the voltage across the power input terminals 98, 99. The amplifier servomotor combination may be such as disclosed in a patent to Willis Gille et al, 2,425,734.

The terminals 96, 97 of the aileron amplifier 95 are connected to a control circuit which includes conductor 111, variable impedance network 101, conductor 119, variable impedance network 115, conductor 120, and potentiometer 43.

Network 101 comprises a rebalancing potentiometer 102 having a slider 103 and a resistor 104, a vertical gyro bank attitude potentiometer 105 having a resistor 106 and a slider 107, and transformer 35 having a primary winding 37 and a secondary winding 108. Resistors 104 and 106 are connected in parallel across the secondary winding 108. The slider 103 is positioned by a follow up connection 110 extending from the operating shaft 92 of the servomotor 94. Conductor 111 extends from the amplifier terminal 97 to slider 103. Slider 107 of potentiometer 105 is positioned according to the aircraft bank angle through a suitable operating connection 112 from a vertical gyroscope 113. The vertical gyroscope 113 is of the type well-known in the art having a rotor with 3 degrees of angular freedom, the spin axis of the rotor being vertical. The rotor is mounted in a casing which is supported about a horizontal axis in an inner gimbal ring with the inner gimbal ring in turn being trunnioned in an outer gimbal ring about a horizontal axis at right angles to the first horizontal axis. Such gyroscopes are illustrated in Figure 1 of the patent to Thiry, 2,190,390.

Network 115 includes a manually operable centering potentiometer 116 having a resistor 117 and a slider 118 and the potentiometer 82 previously described. The resistors 117 and 84 are connected in parallel across the secondary winding 85 of transformer 35. A conductor 119 extends from the slider 107 to slider 118 of the trim potentiometer 116.

The potentiometer 43 has been previously described. A conductor 120 extends from the slider 83 of the integration potentiometer 82 to the center tap 46 of secondary winding 45 associated with potentiometer 43.

The rudder (not shown) of the aircraft is operated by cables 121 extending from a cable drum 122 carried by an output shaft 139 of the rudder servomotor 123. The rudder servomotor 123 is reversibly controlled by a rudder amplifier 124. The rudder amplifier-rudder servomotor combination may be similar to the amplifier-motor combination used for operating the ailerons. The rudder amplifier 124 is provided with power input terminals 125 and 126 which are connected to the 400 cycle source. The amplifier includes control signal input terminals 127 and 128 which are connected to a control circuit. The control circuit extends from terminal 128, conductor 129, variable impedance network 130, conductor 140, conductor 119, variable impedance network 115, conductor 120, potentiometer 43, conductor 47, to ground, and to ground terminal 127 of amplifier 124.

Network 130 includes a rebalancing potentiometer 131 having a slider 132 and a resistor 133; a vertical gyro bank attitude potentiometer 134 having a slider 135 and a resistor 136; and a transformer 35 having primary winding 37 and secondary winding 137. The resistors 133 and 136 are connected in parallel across the secondary winding 137. Slider 132 is operatively driven in accordance with the rudder servomotor position by an operating connection 138 extending from the output shaft 139 of motor 123. Conductor 129 extends from terminal 128 to slider 132. Slider 135 is operatively positioned from the vertical gyroscope 113 in accordance with the bank of the craft through the operating connection 112. Networks 115 and potentiometer 43 have been previously described. A conductor 140 extends from slider 135 to conductor 119 and the circuit proceeds thence to slider 118, network 115, slider 83, conductor 120, potentiometer 43, and conductor 47 to ground.

*Operation*

It will be appreciated that networks 101, 115, 130, and potentiometer 43 may be operated to derive control signals. For example, if the slider 103 and the slider 107 of network 101 are at the electrical centers of their respective resistors there is no potential difference between the sliders. If slider 107 be held fixed and slider 103 be moved in one or the other direction from its electrical center on resistor 104 its potential with respect to slider 107 will change in magnitude depending upon the extent of such movement and the phase of said potential depends also upon the direction in which the slider is moved from its electrical center. It is also apparent that as long as sliders 103 and 107 have the same relative position on their respective resistors that there will be no potential difference between them. It is also apparent that with respect to potentiometer 43 that if the slider 42 is at the electrical center of its resistor 44 that it has the same potential as the center tap 46 of the secondary 45. Also, if the slider 42 will be moved in one or the other direction from its electrical center that its potential with respect to the center tap varies in magnitude in accordance with the extent of movement and varies in phase in accordance with the direction of movement from its electrical center. It will also be appreciated that any signals generated in networks 101, 115, and potentiometer 43, by the series connection of the elements, are algebraically combined in the circuit for controlling aileron amplifier 95 and that further any signals in network 130, 115, and potentiometer 43 are algebraically combined and control the rudder amplifier 124. When any such resultant unbalance signal occurs in the circuit of either amplifier its respective servomotor is operated to position the slider of its rebalance potentiometer until such network is again in balanced condition.

The manner in which the slider 42 of potentiometer 43 is positioned to provide a signal proportional to the lateral displacement of the aircraft from the ground track is clearly evident since a simple proportioning system is used in which the motor 21 is positioned as indicated. The signal from the motor driven potentiometer 32 is balanced against the signal from the D. C. to A. C. converter which is controlled by the localizer receiver 11, the signal from winding 29 of the velocity signal generator serving to anticipate the arrival of the motor to balance position and hence preventing hunting.

If there is a signal from the potentiometer 43 due to displacement of the craft from the localizer beam or ground path, the bridge network of the aileron and rudder servomotor amplifiers is unbalanced resulting in the operation of the servomotors and the positioning of the ailerons and rudder causing the craft to turn toward the beam. The operation of the aileron and rudder servomotors causes the positioning of their respective follow up sliders 103 and 132 to rebalance both the amplifier control signal networks.

The vertical gyro 113 in response to the banking of the aircraft positions its sliders 107 and 135 causing an opposite unbalance of the control circuits for the amplifiers 95 and 124. This opposite unbalance of the amplifier control circuits results in reverse movement of the aileron and rudder servomotors to move their respective control surfaces toward normal position.

The operation of the arrangement 50, generally, will be considered. The operation thereof will be considered first when the arrangement operates as an integrater of the rate of change of heading of the craft. Magnetic clutch 69 will have been opened to permit spring 86 to center sliders 74 and 83 and will then be reclosed.

We may assume slider 79 of the voltage dividing potentiometer 78 to be displaced to the lower end shown of resistor 80, and it is now apparent that any adjustment of slider 74 of potentiometer 73 will produce no voltage between the tap 79 and the lower end of the voltage dividing resistor 80.

If the aircraft undergoes a change of heading, the rate gyroscope 51 precesses and adjusts slider 56 in accordance with the rate of change in heading. The input control circuit to amplifier 59 is thereby unbalanced and the output of the amplifier 59 is applied to the motor 60. The motor 60 drives its velocity generator 64 at a speed such that the voltage generated in the secondary winding 66 thereof approaches the voltage derived from the rate gyro potentiometer 55. It is thus apparent that the motor 60 is rotating at a speed proportional to the rate of change of heading of the aircraft. The motor 60 drives the slider 83 of the integration potentiometer 82; and since the slider 83 is positioned as long as the motor 60 rotates and is positioned at a speed proportional to the rate of rotation of motor 60, it is therefore apparent that the position assumed by slider 83 is proportional to the total change of heading of the craft. In this respect the arrangement 50 is analogous to a conventional directional gyroscope such as shown in Figure 1 of the patent to Thiry 2,190,390 wherein the arm 4' is analogous to the slider 83 of potentiometer 82. Thus, the slider 83 is positioned in accordance with the change of heading of the craft or in accordance with the integrated rate of change of heading.

The operation of arrangement 50 as an integrator of heading rate change will be considered in connection with the entire system where the potentiometer 82 is adjusted as described in accordance with the integral of the rate of change of heading or in other words change of heading of the craft. Assume that the craft is flying parallel to the ground track or localizer beam but displaced laterally therefrom. Assume further that the craft is in straight and level flight condition with the amplifier control circuits in balanced condition. The localizer receiver in accordance with the lateral displacement of the craft through its amplifier 16 and control motor 21 will position slider 42 of potentiometer 43 in accordance with the lateral displacement of the craft from the beam. Assume from the pilot's aspect that he is to the right of the beam. The signal from potentiometer 43 will call for the craft to turn toward the left. In other words, the signal from potentiometer 43 will now cause the operation of the aileron and rudder amplifiers and their respective servomotors to cause the craft to bank towards the left. As the craft banks, the vertical gyroscope 113, as stated, in response to the bank attitude, positions the sliders 107 and 135 causing the reverse unbalance of the amplifier control circuits and the movement of the ailerons and rudder toward their normal positions.

The rate gyroscope 51 also responds to the turning of the aircraft about its vertical or turn axis and through its motor 60 causes the slider 83 to be displaced in accordance with the integration of the rate of change of heading of the craft. As the aircraft moves toward the beam the signal from the localizer receiver 11 decreases whereas as the craft continues to turn the signal from potentiometer 82 increases. The control circuits for the aileron and rudder amplifiers are thereby unbalanced in such a direction as to cause the aircraft to change its attitude from a left bank turn toward straight and level flight. The craft at this time when in straight and level flight may not be changing its heading. It is approaching the localizer beam and thereby decreasing the signal from potentiometer 43. While the slider 83 of potentiometer 82 may not be adjusted during this straight flight portion, its signal does not decrease, and therefore it is apparent that with slider 42 being driven toward center and with slider 83 unmoved a further unbalance of the amplifier control circuits exists. This further unbalance of the amplifier control circuits causes the movement of the aileron and rudder servomotor so that the craft makes a bank turn toward the right. The vertical gyroscope 113 as before causes movement of the control surfaces back toward normal position.

The rate gyroscope 51 in response to the right turn of the aircraft causes the reverse unbalance of its amplifier 59 and the reverse rotation of motor 60 whereby slider 83 is driven from its displaced position toward the electrical center of resistor 84. At this time both the signals from potentiometer 82 due to the right turn of the craft and the potentiometer 43 due to the fact that the craft is approaching the beam decrease and ultimately vanish when the craft is on the beam.

With the arrangement 50 controlling potentiometer 82 to provide a signal proportional to the integration of the rate of change of heading, the apparatus will function satisfactorily providing that there is no cross wind tending to deflect the craft from the localizer beam. Lack of compensation for cross wind is evident since the craft has its heading in the direction of the ground track and there is no component of craft velocity transverse to the ground track to offset the effect of the crosswind.

The operation of arrangement 50 will be considered system-wise whereby it may provide an attitude of the craft to compensate for the effect of a cross wind with respect to the ground track. To compensate for a cross wind effect, the slider 79 of voltage divider 78 is moved toward the upper end of resistor 80 in the figure and the extent of movement determines the angle between craft heading and ground track which compensate for cross wind. Assume again that the craft is to the right of the localizer beam from the pilot's aspect and that a signal is derived from potentiometer 43 calling for a left banked turn of the craft. In the arrangement 50, the rate gyroscope 51 responds to the turning of the craft and as before displaces slider 56, of potentiometer 55. The motor 60 again rotates and drives its velocity generator 64 and the slider 74 through the gear train 88. The motor 60 also positions the slider 83 of the integration potentiometer 82.

It is now apparent that the control circuit of amplifier 59 includes in addition to the potentiometer 55 and the velocity generator secondary winding 66 a voltage from the potential divider 78 associated with the motor driven potentiometer 73. Thus, the speed of rotation of motor 60 will no longer be in proportion to the rate of change of heading of the aircraft after the slider 74 of potentiometer 73 has been displaced from its center position by means of motor 60 operating through gear train 88. As the craft continues to turn toward the left under control of the localizer receiver signal as applied to potentiometer 43, the motor 60 continues to displace the slider 74. Eventually a point is reached while the craft is still in the left bank turn when the voltage from the potential divider 78 is equal to the signal from the rate gyroscope potentiometer 55. When these two voltage signals are equal, the control circuit of amplifier 59 is balanced and the motor 60 stops rotating. As stated however the craft continues to turn toward the left. Thus the slider 83 now being stationary does not assume a position corresponding to an integral of the heading rate or with the total change in heading of the aircraft but a position less than this change which is less than the full integration of heading change rate or may be termed a partial integration of heading change rate.

The left banked turn of the craft has brought it toward the localizer beam and eventually the signal from the potentiometer 82 which is now only a partial integration of the rate of change of heading of the craft approaches the value of the signal from the potentiometer 43 controlled by the localizer receiver 11. The craft now changes attitude toward a straight and level flight position but still approaches the beam.

Since the craft is at a decreased bank and at a lower rate of change in heading, it is apparent that in arrangement 50 that the signal from voltage divider 78 exceeds that from the rate gyroscope 51. This causes the opposite rotation of the motor 60 and the movement of slider 83 toward its center position and the movement of slider 74 through gear train 88 toward its center position on its resistor 75. The rate of decay of the signal from potentiometer 43 is greater than that from potentiometer 82. With potentiometer 82 providing a signal equal to that from potentiometer 43 the craft reaches straight and level flight.

With the craft flying in a straight and level attitude toward the beam, the voltage from potentiometer 82 eventually exceeds that from the potentiometer 43 causing a reverse or right bank turn of the craft. The rate gyroscope 51 in response to this right turn of the craft operates to return slider 83 towards its electrical center on resistor 84. This decrease in the signal from potentiometer 82 due to the movement of slider 83 toward its center position causes the right bank attitude of the craft to decrease.

If the slider 83 is at the center of resistor 84 and the slider 42 is at the center of resistor 44 when the craft crosses the beam, the craft will be in a level flight position but will be headed across the beam. This is due to the fact that in the adjustment of potentiometer 82 the arrangement did not integrate the rate of change in heading of the aircraft during the entire time while the localizer signal was in control of the heading of the craft. Should the aircraft be subject to a cross wind, the angle at which the craft is headed across the ground track may compensate for the drift due to the cross wind. Since the cross wind may be at various velocities, the velocity merely determines the time required to reach the ground track.

While the operation has been considered when the craft was, from the pilot's viewpoint, to the right of the beam, the operation is similar should the craft be initially to the left of the beam. In either case, the angle that the craft assumes across the ground craft is sufficient to maintain the craft in a flight path along the ground track.

In accordance with the above detailed description it will now be understood that the invention contemplates the complete automatic control of the flight of an aircraft in accordance with positional signals derived from radio means on the one hand and in accordance with rate of heading change responsive means on the other which heading means in one operation provides a total integration of the rate of change of heading of the aircraft and in another case provides a partial integration of the rate of change of the heading of the aircraft in order to compensate for cross winds or other permanent effects tending to displace the craft from a predetermined ground track.

What is claimed is:

1. Control apparatus for an aircraft in flight having control surfaces for steering said craft along a desired course defined by radio signals, said apparatus comprising: motor means for operating said surfaces; control means responsive to a first craft control signal proportional to the lateral distance of said craft from said course for operating said motor means to effect change in heading of said craft toward said course to reduce said distance; means responsive to the rate of change of heading of said craft for providing a heading rate signal; a control motor means; a control motor velocity signal generator driven by said control motor means; a control motor displacement signal generator driven by the control motor means; means for selecting a portion of the motor displacement signal depending on the velocity of the wind across the desired course, signal combining means connected to the control motor means for operation thereof on the presence of a resultant signal in said signal combining means, said combining means being responsive to the heading rate signal, the motor velocity signal, and the selected portion of the motor displacement signal; further means displaced by the control motor means to provide a second craft control signal for said control means which is thus a partial integration of said heading rate signal and thus less than the actual craft change in heading; means for terminating operation of said control motor means in one direction while said first craft control signal is yet predominant over the second craft control signal to provide change in craft heading in excess of the partial integration of the rate signal; whereby as said second craft control signal becomes subsequently predominant over the control signal due to reduction of said distance the heading path has a point of inflexion and since said second craft control signal is less than the original heading change of said craft when the first craft control signal was predominant said craft has a heading across said course on reducing said second craft control signal to zero.

2. In apparatus for automatically steering a dirigible craft along a ground track defined by radio signals, including means for providing a first craft control signal which is a function of the lateral distance of said craft from said track: balanceable circuit means responsive to said first signal for changing the heading of said craft toward said track so that the signal decreases as the craft nears the track; means responsive to the rate of change of heading of said craft for providing a heading rate signal; a motor means; a motor rate signal generator driven by said motor means; a motor displacement signal generator driven by the motor means; means for selecting a portion of the motor displacement signal; signal combining means controlling the motor means and responsive to the heading rate signal, the motor rate signal, and the selected portion of the motor displacement signal; further means driven by the motor means for providing a second craft control signal which is thus a partial integration of the heading change rate of said craft; and means for impressing said second craft control signal on said circuit means in opposition to the first craft control signal so that the craft changes heading beyond the craft angular position where total integration of heading rate would provide a signal equal to the lateral signal, whereby as said signals are reduced to zero while craft heading is being reversely changed said craft is positioned at a heading at an angle to said ground track.

3. In flight control apparatus for a movable aircraft including means for producing a first electrical craft control signal proportional to the distance of said craft from a predetermined radio beam defined path; balanceable circuit means responsive to said signal for heading said craft toward said path; follow-up means operated by the circuit means to rebalance the circuit means; angular rate signal providing means operated in response to the rate of change of heading of said craft; operable means controlled by said rate responsive means comprising a motor means, a motor rate signal generator, a motor displacement signal generator; means for selecting a portion of the output of the motor displacement signal generator, a signal responsive means connected to the motor for effecting operation thereof and responsive to the angular rate signal, the motor rate signal, and the selected portion of the motor displacement signal; further means driven by the motor means for producing a second electrical craft control signal which is less than a total integration of the angular rate of said craft; and means for impressing said second craft control signal on said circuit means in opposition to the first craft control signal, so that upon departure of the craft from the radio beam defined path said craft flight is altered to turn the craft toward said path.

4. In flight control apparatus, for an aircraft having adjustable means for controlling craft heading for steering said craft along a ground track, wherein a first craft control signal proportional to the distance of said craft from said track is provided; motor means including a balanceable control network responsive to said signal for operating said adjustable means; followup means driven by the motor means to rebalance the network; further means including a rate of change of heading responsive signal generator, a control motor, a control motor velocity signal generator driven by the control motor, a control motor displacement signal generator, means for selecting a portion of the control motor displacement signal, control means controlling the control motor and responsive to the heading rate signal, the control motor velocity signal, and the selected portion of the control motor displacement signal; means displaced by the control motor for providing a second craft control signal which is thus proportional to a partial integration of said craft rate of turn resulting from said operation of the surfaces; and means for controlling said balanceable network of said motor means from said second craft control signal in opposition to the first craft control signal, for positioning said craft on a heading relative to said track to compensate for drift of said craft laterally of said ground track due to the cross wind.

5. In control apparatus for an aircraft having control surfaces for steering said craft and means for deriving a first voltage signal proportional to the lateral displacement of said craft from a ground track defined by overlapping radio beams, motor means connected to the signal deriving means and responsive to said signal for operating said control surfaces to turn said craft heading through an angle toward said ground track; voltage providing means including means responsive to the rate of change of heading of said craft to provide a heading rate signal, a control motor, a control motor rate signal generator, a control motor displacement signal generator, means for selecting a portion of the control motor displacement signal, an amplifier having its output connected to said control motor and its input controlled by the heading rate signal, the control motor rate signal, and the selected part of the control motor displacement signal depending on the ground track cross wind velocity; means driven by the control motor to thus provide a partial integration of said heading change rate during said turn and thus a second craft control voltage signal less than the theoretical voltage from total integration of rate of change in craft heading, and connecting means for controlling said motor means from said second craft control signal in opposition to the first craft control signal, whereby the heading of said craft follows a reverse curve toward said ground track when said second signal exceeds said first signal wherein the heading change on the reverse part of the curve due to the partial integration of craft heading rate is less than that on the initial part of the curve so that the craft assumes a heading across the ground track to prevent lateral displacement therefrom due to cross winds.

6. Means for compensating for lateral drift of an aircraft across a ground track said craft having steering mechanism and means for deriving a first craft control signal in accordance with the displacement of said craft from the ground track comprising: motor means controlled by said signal for turning said displaced craft toward said track from a position laterally spaced therefrom; a rate gyroscope precessible an extent in accordance with the rate of change of heading of the craft; means connected to the gyroscope for generating a heading rate signal, a control motor, a control motor velocity signal generator driven by the control motor, a control motor displacement signal generator, means for selecting a portion of the control motor displacement signal, amplifier means having its output connected to the control motor and its input controlled by the heading rate signal, the control motor velocity signal, and the selected portion of the control motor displacement signal, the selection depending on the ground track cross wind velocity; further means driven by the control motor having consequently thus a displacement corresponding to partially integrating with respect to time the extent of precession of said gyroscope and providing a second craft control signal so that said partial integration is less than a theoretical total integration of craft heading rate denoting the actual heading change of said craft initiated from said first craft control signal; means for controlling said motor means from said second signal in opposition to the first signal whereby said craft makes a reverse curve when said second signal exceeds said first signal but said change in heading of said craft in the reverse portion is less than that in the first portion all whereby said craft assumes a heading across said ground track to prevent lateral drift thereof.

References Cited in the file of this patent

UNITED STATES PATENTS

| Number | Name | Date |
|---|---|---|
| 1,958,258 | Alexanderson | May 8, 1934 |
| 1,958,259 | Becker | May 8, 1934 |
| 2,280,117 | Crane et al. | Apr. 22, 1942 |
| 2,315,755 | Warner | Apr. 6, 1943 |
| 2,361,790 | Noxon | Oct. 31, 1944 |
| 2,372,184 | Carlson | Mar. 27, 1945 |
| 2,471,821 | Kutzler et al. | May 31, 1949 |
| 2,482,809 | Thompson | Sept. 27, 1949 |
| 2,496,809 | Moseley | Feb. 7, 1950 |
| 2,513,537 | Williams | July 4, 1950 |
| 2,548,278 | Wirkler | Apr. 10, 1951 |
| 2,553,786 | Redemske | May 22, 1951 |
| 2,670,454 | Wilson | Feb. 23, 1954 |